US012088045B2

(12) United States Patent
Hoshiba et al.

(10) Patent No.: US 12,088,045 B2
(45) Date of Patent: Sep. 10, 2024

(54) CONNECTOR SET AND ELECTRONIC CIRCUIT DEVICE

(71) Applicant: Murata Manufacturing Co., Ltd., Kyoto-fu (JP)

(72) Inventors: Hiroyuki Hoshiba, Nagaokakyo (JP); Minoru Mamuro, Nagaokakyo (JP); Hideki Tsukamoto, Nagaokakyo (JP); Yuma Amemori, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 421 days.

(21) Appl. No.: 17/648,391

(22) Filed: Jan. 19, 2022

(65) Prior Publication Data

US 2022/0140534 A1 May 5, 2022

Related U.S. Application Data

(63) Continuation of application No. PCT/JP2020/030083, filed on Aug. 5, 2020.

(30) Foreign Application Priority Data

Aug. 9, 2019 (JP) ................................ 2019-147884
Oct. 4, 2019 (JP) ................................ 2019-183564
Mar. 16, 2020 (JP) ................................ 2020-045279

(51) Int. Cl.
*H01R 13/00* (2006.01)
*H01R 12/00* (2006.01)
(Continued)

(52) U.S. Cl.
CPC ....... *H01R 13/6461* (2013.01); *H01R 12/716* (2013.01); *H01R 13/20* (2013.01); *H01R 13/22* (2013.01); *H01R 12/57* (2013.01)

(58) Field of Classification Search
CPC ...... H01R 12/57; H01R 12/716; H01R 12/73; H01R 13/20; H01R 13/22; H01R 13/6461
See application file for complete search history.

(56) References Cited

U.S. PATENT DOCUMENTS 7,648,391 B2 * 1/2010 Nishimura ........... H01R 33/975 439/564
7,815,467 B2 * 10/2010 Tsuchida ............. H01R 12/716 439/607.09
(Continued)

FOREIGN PATENT DOCUMENTS

JP 2010-061847 A 3/2010
JP 2016-085994 A 5/2016
(Continued)

OTHER PUBLICATIONS

International Search Report issued in PCT/JP2020/030083; mailed Oct. 13, 2020.
(Continued)

*Primary Examiner* — Abdullah A Riyami
*Assistant Examiner* — Thang H Nguyen
(74) *Attorney, Agent, or Firm* — Studebaker & Brackett PC

(57) ABSTRACT

A first connector of a connector set includes first internal terminals, a first insulation member that fixes the first internal terminals, and first external terminals having a surrounding shape portion that surrounds the first internal terminals and the first insulation member. The second connector includes second internal terminals, a second insulation member that fixes the second internal terminals, and a second external terminal having a surrounding shape portion that surrounds the second internal terminals and the second insulation member. The first external terminals have cutout portions at a portion that is part of the surrounding shape portion of the first external terminal and faces a ground
(Continued)

conductor formed at a mounting position of the second connector of the second circuit substrate.

20 Claims, 17 Drawing Sheets

(51) Int. Cl.

| | |
|---|---|
| ***H01R 12/71*** | (2011.01) |
| ***H01R 13/20*** | (2006.01) |
| ***H01R 13/22*** | (2006.01) |
| ***H01R 13/6461*** | (2011.01) |
| *H01R 12/57* | (2011.01) |

(56) References Cited

U.S. PATENT DOCUMENTS

| | | | | |
|---|---|---|---|---|
| 10,897,097 | B2 * | 1/2021 | Hirakawa | H01R 13/115 |
| 11,011,874 | B2 * | 5/2021 | Kitazawa | H01R 12/716 |
| 11,522,309 | B2 * | 12/2022 | Yanase | H01R 13/193 |
| 11,916,323 | B2 * | 2/2024 | Maeda | H05K 1/0225 |
| 2006/0141811 | A1 * | 6/2006 | Shichida | H01R 24/50<br>439/63 |
| 2018/0054013 | A1 * | 2/2018 | Osaki | H01R 13/05 |
| 2018/0366843 | A1 * | 12/2018 | Maki | H01R 24/42 |
| 2019/0115692 | A1 * | 4/2019 | Tanaka | H01R 12/774 |

FOREIGN PATENT DOCUMENTS

| | | | | |
|---|---|---|---|---|
| JP | 6399342 B2 | | 10/2018 | |
| JP | 2019-087382 A | | 6/2019 | |
| JP | 2020-123438 A | | 8/2020 | |
| WO | WO-2016178356 A1 | * | 11/2016 | H01R 12/707 |
| WO | WO-2017053149 A1 | * | 3/2017 | H01R 12/732 |
| WO | WO-2017212862 A1 | * | 12/2017 | H01R 12/707 |

OTHER PUBLICATIONS

Written Opinion of the International Searching Authority issued in PCT/JP2020/030083; mailed Oct. 13, 2020.

* cited by examiner

CONNECTOR SET AND ELECTRONIC CIRCUIT DEVICE

CROSS-REFERENCE TO RELATED APPLICATIONS

This application claims benefit of priority to International Patent Application No. PCT/JP2020/030083, filed Aug. 5, 2020, and to Japanese Patent Application No. 2019-147884, filed Aug. 9, 2019, Japanese Patent Application No. 2019-183564, filed Oct. 4, 2019, and Japanese Patent Application No. 2020-045279, filed Mar. 16, 2020, the entire contents of each are incorporated herein by reference.

BACKGROUND

Technical Field

The present disclosure relates to a connector for coupling paths of an electric signal, an electric voltage, an electric current and the like, and an electronic circuit device including the connector.

Background Art

Japanese Unexamined Patent Application Publication No. 2016-85994 discloses a connector in which first reinforcing metal fittings are disposed at both ends of a first connector and second reinforcing metal fittings to fit to the first reinforcing metal fittings are disposed at both ends of a second connector so that the first connector having multiple coupling terminals and the second connector having counter side coupling terminals for engaging with the coupling terminals are accurately fitted to each other. The first reinforcing metal fittings and the second reinforcing metal fittings are made of a metal material, and have a discontinuous U-shaped open shape in plan view.

SUMMARY

In a connector set having multiple coupling terminals, the frequency of a signal transmitted through the coupling terminal is becoming higher. In a case where a connector set having the multiple coupling terminals is used for transmission of a radio frequency signal, a ground terminal disposed in the vicinity of the coupling terminals to transmit the radio frequency signal, a substrate on which the connector set is mounted, and the like are likely to resonate in an operating frequency band due to an electromagnetic field radiated from the coupling terminals to transmit the radio frequency signal, and radiation noise is likely to be generated. As a result, stable signal transmission in the transmission frequency band of a signal is disturbed.

In particular, there is a tendency that the height of the fitting becomes low (insertion-removal length becomes shorter) in accordance with a reduction in size of a connector set, and therefore parasitic capacitance generated between an external terminal and an electrode of a circuit substrate on which a counterpart connector is mounted is large in such a connector set. Thus, when an electric field of a radio frequency signal is applied to the parasitic capacitance, radio frequency characteristics may deteriorate.

Therefore, the present disclosure provides a connector set having excellent radio frequency characteristics by reducing parasitic capacitance and preventing unnecessary resonance in an operating frequency band; and an electronic circuit device including the connector set.

A connector set, as an example of the present disclosure, includes a first connector mounted on a first circuit substrate; and a second connector which fits to the first connector to and from which the second connector is insertable and removable in an insertion-removal direction, with the second connector being mounted on a second circuit substrate having a ground conductor. The first connector includes a first internal terminal, a first insulation member that fixes the first internal terminal, and a first external terminal having a surrounding shape portion that surrounds the first internal terminal and the first insulation member. The second connector includes a second internal terminal, a second insulation member that fixes the second internal terminal, and a second external terminal having a surrounding shape portion that surrounds the second internal terminal and the second insulation member; and the second external terminal is connected to the ground conductor of the second circuit substrate. In a state in which the first connector and the second connector are fitted to each other, the first internal terminal and the second internal terminal are in contact with each other and the first external terminal and the second external terminal are fitted to each other. When viewed in the insertion-removal direction, an outer periphery of the second external terminal covers an outer periphery of the first external terminal and the first external terminal overlaps with the ground conductor of the second circuit substrate. The first external terminal has a cutout portion at a portion that is part of the surrounding shape portion of the first external terminal and faces the ground conductor of the second circuit substrate.

An electronic circuit device according to the present disclosure includes a first circuit substrate, a second circuit substrate, a first connector mounted on the first circuit substrate, and a second connector which fits to the first connector to and from which the second connector is insertable and removable in an insertion-removal direction, the second connector being mounted on the second circuit substrate. The second circuit substrate has a ground conductor at the mounting position of the second connector, and the first connector and the second connector correspond to the first connector and the second connector included in the connector set above.

According to the present disclosure, it is possible to obtain a connector set having excellent radio frequency characteristics in which parasitic capacitance generated when a first connector and a second connector are connected is reduced, and unnecessary resonance in an operating frequency band is prevented; and an electronic circuit device including the connector set.

DETAILED DESCRIPTION

First Embodiment

Figure 1:
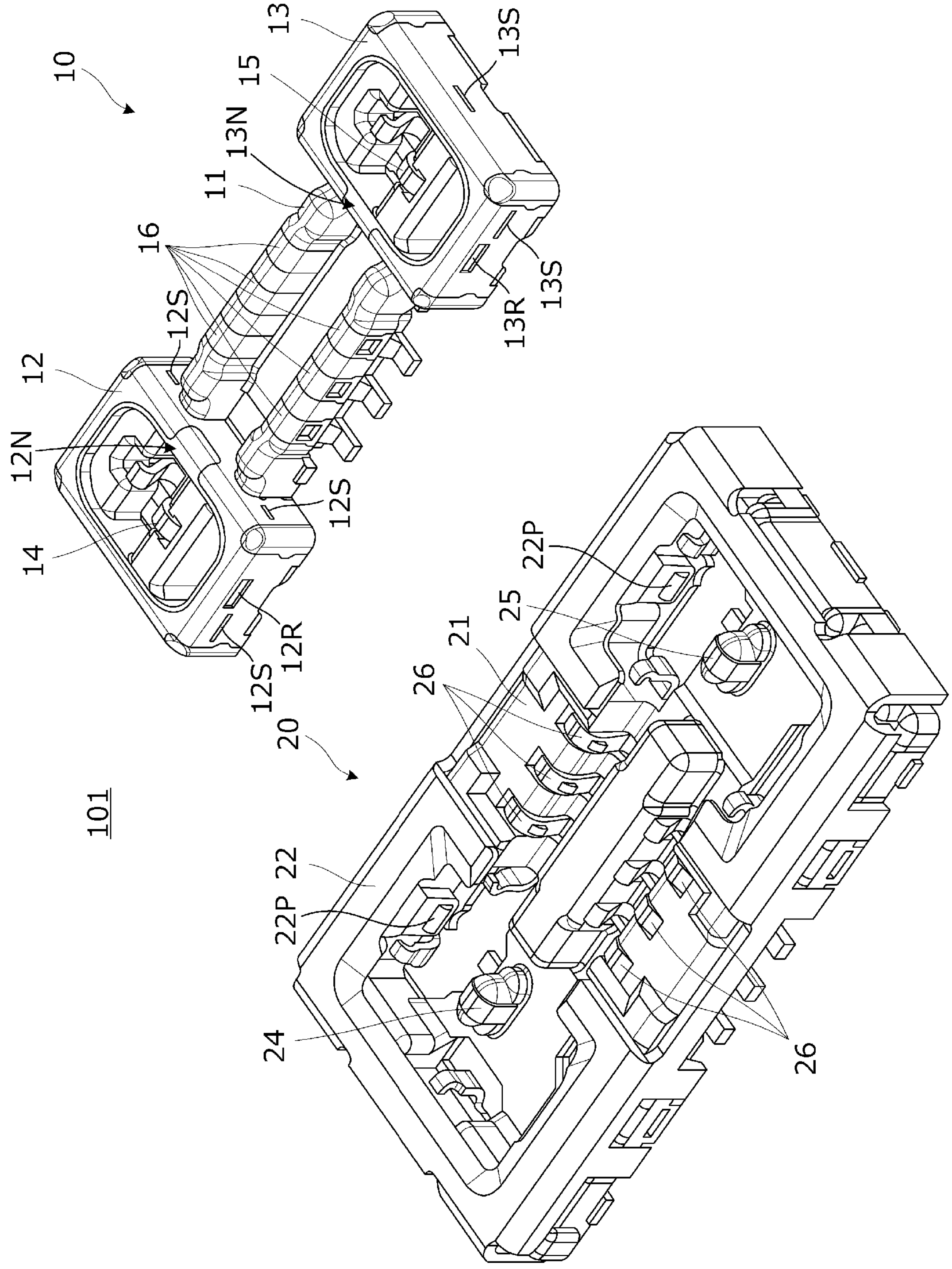
FIG. 1 is a perspective view of a connector set according to a first embodiment.
Figure 2:
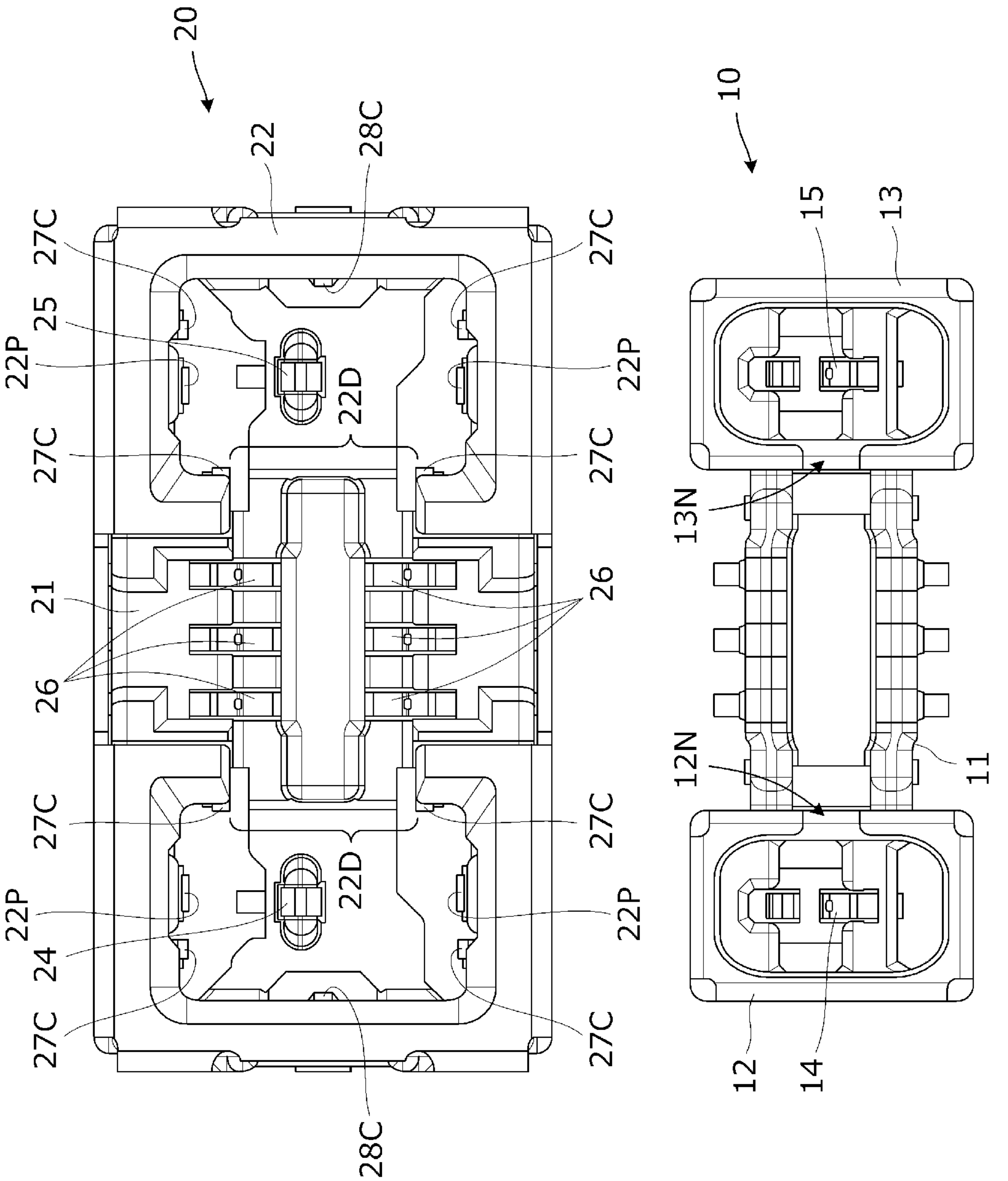
FIG. 2 is a plan view of a first connector and a second connector of the connector set.

FIG. 1 is a perspective view of a connector set 101 according to a first embodiment. FIG. 2 is a plan view of a first connector 10 and a second connector 20. The connector set 101 is constituted of the first connector 10 and the second connector 20. As will be described later, the first connector 10 is mounted on a first circuit substrate to be used, and the second connector 20 is mounted on a second circuit substrate to be used. In FIG. 1, the first connector 10 is inserted into and removed from the second connector 20 in an upside-down state.

The first connector 10 includes: first internal terminals 14, 15, and 16; a first insulation member 11 that fixes the first internal terminals 14, 15, and 16; and first external terminals 12 and 13 having a surrounding shape portion that surrounds the first internal terminals 14 and 15, and the first insulation member 11. Each of the surrounding shape portions of the first external terminals 12 and 13 is O-shaped in plan view.

The second connector 20 includes: second internal terminals 24, 25 and 26; a second insulation member 21 that fixes the second internal terminals 24, 25, and 26; and a second external terminal 22 having a surrounding shape portion that surrounds the second internal terminals 24, 25, and 26, and the second insulation member 21. The surrounding shape portion of the second external terminal 22 has a shape in which two C-shaped portions face each other in plan view. The term "surrounding shape portion" in the present description is not limited to a shape portion that surrounds an entire periphery, and includes a shape portion that partially surrounds a periphery.

Figure 3:
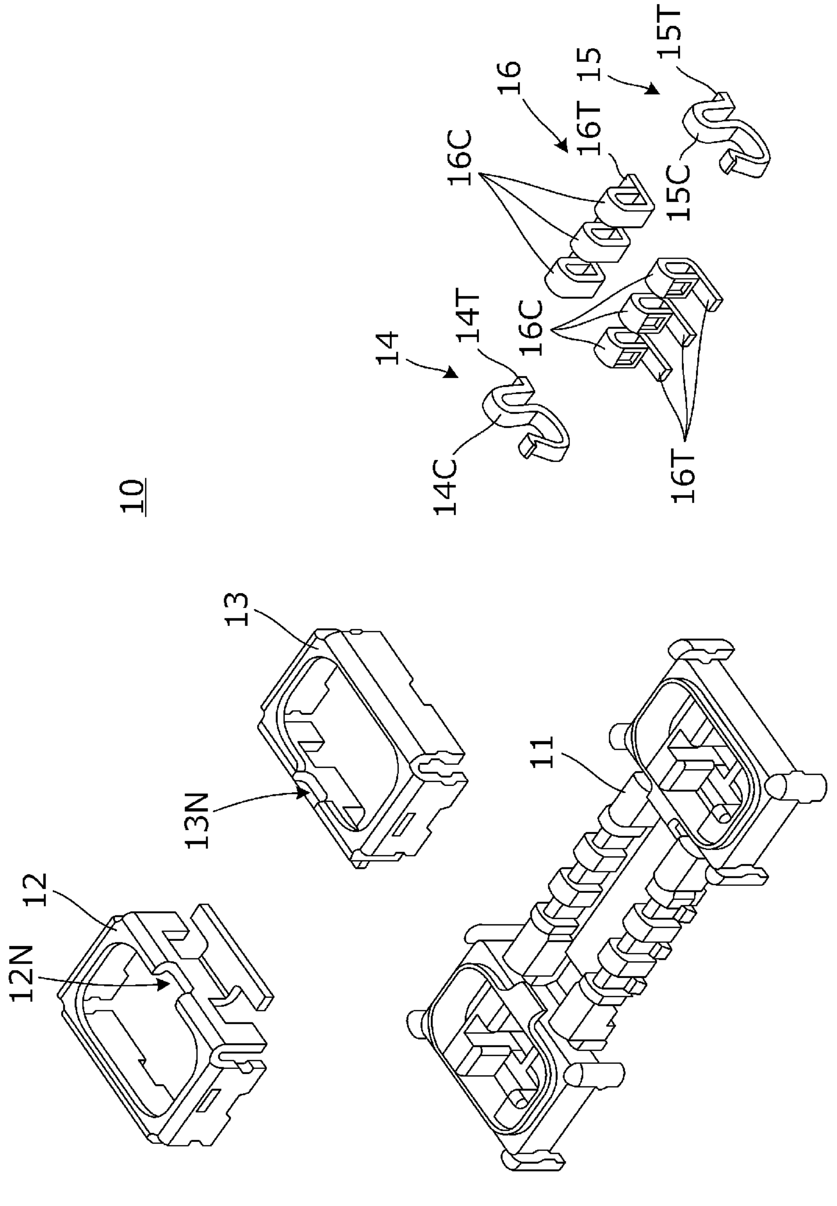
FIG. 3 is an exploded perspective view of the first connector illustrating the constituting components thereof.
Figure 4:
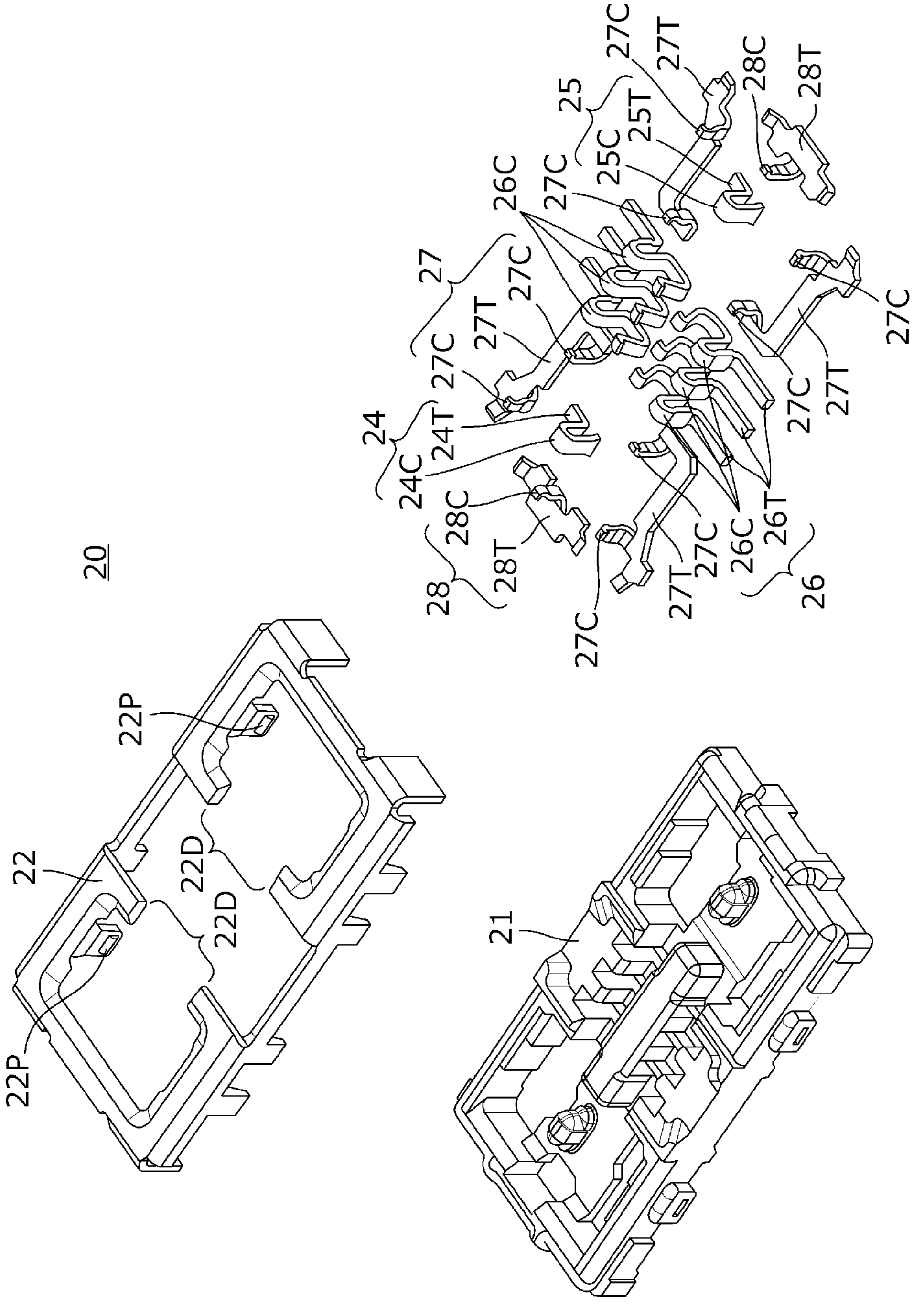
FIG. 4 is an exploded perspective view of the second connector illustrating the constituting components thereof.

FIG. 3 is an exploded perspective view of the first connector 10 illustrating the constituting components thereof. FIG. 4 is an exploded perspective view of the second connector 20 illustrating the constituting components thereof.

The first internal terminal 14 of the first connector 10 is constituted of a contact portion 14C and a mount portion 14T. Similarly, the first internal terminal 15 is constituted of a contact portion 15C and a mount portion 15T. Each of the six first internal terminals 16 is constituted of a contact portion 16C and a mount portion 16T.

The first internal terminals 14, 15, and 16 are formed by sheet metal processing and are fitted into the first insulation member 11. That is, the first internal terminals 14, 15, and 16 are held by the first insulation member 11. For example, the first internal terminals 14, 15, and 16 may be formed in the first insulation member 11 by insert molding.

Each of the first external terminals 12 and 13 is a component formed by sheet metal processing, and is fitted into the first insulation member 11. For example, the first external terminals 12 and 13 may be formed in the first insulation member 11 by insert molding. In the first external terminal 12 in the orientation illustrated in FIG. 3, there is formed a cutout portion 12N recessed downward from the upper surface of the first external terminal 12. Similarly, in the first external terminal 13, there is formed a cutout portion 13N recessed downward from the upper surface of the first external terminal 13.

The second internal terminal 24 of the second connector 20 is constituted of a contact portion 24C and a mount portion 24T. Similarly, the second internal terminal 25 is constituted of a contact portion 25C and a mount portion 25T. Each of the six second internal terminals 26 is constituted of a contact portion 26C and a mount portion 26T. Four ground terminals 27 are constituted of contact portions 27C and mount portions 27T. Further, two ground terminals 28 are constituted of contact portions 28C and mount portions 28T.

The second internal terminals 24, 25, and 26, and the ground terminals 27 and 28 are formed by sheet metal processing and are fitted into the second insulation member 21. That is, the second internal terminals 24, 25, and 26, and the ground terminals 27 and 28 are held in the second insulation member 21. For example, the second internal terminals 24, 25, and 26, and the ground terminals 27 and 28 may be formed in the second insulation member 21 by insert molding.

The second external terminal 22 is a component formed by sheet metal processing, and is fitted into the second insulation member 21. For example, the second external terminal 22 may be formed in the second insulation member 21 by insert molding.

The first internal terminals 14 and 15 of the first connector 10 and the second internal terminals 24 and 25 of the second connector 20 are terminals to couple to a signal path for transmitting a millimeter wave band signal, for example. The first internal terminal 16 of the first connector 10 and the second internal terminal 26 of the second connector 20 are terminals to couple to a signal path for transmitting a signal in a frequency band lower than the millimeter wave band or a DC electric power supply.

The first internal terminals 14 and 15 of the first connector 10, and the second internal terminals 24 and 25 of the second connector 20 are terminals to couple to a signal path of a millimeter wave band, for example. The first internal terminal 16 of the first connector 10 and the second internal terminal 26 of the second connector 20 are terminals to couple to a radio frequency signal in a frequency band lower than the millimeter wave band or a DC electric power supply.

Figure 5:
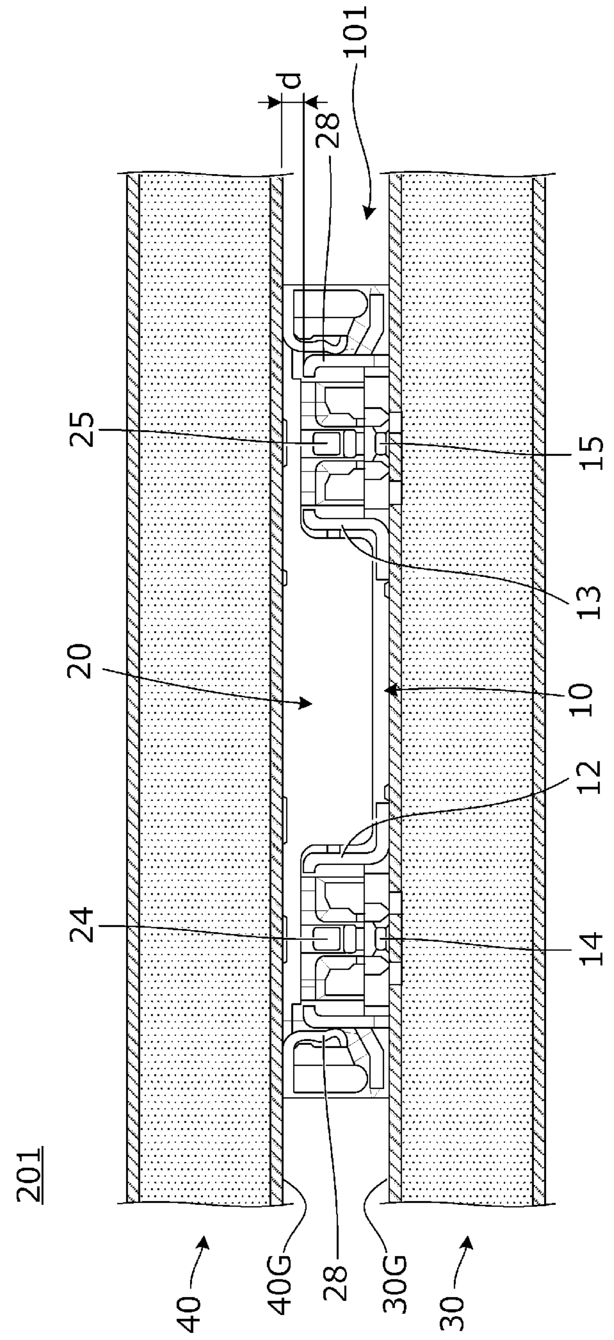
FIG. 5 is a sectional view of an electronic circuit device in a state in which a first circuit substrate and a second circuit substrate are coupled via the connector set.
Figure 6:
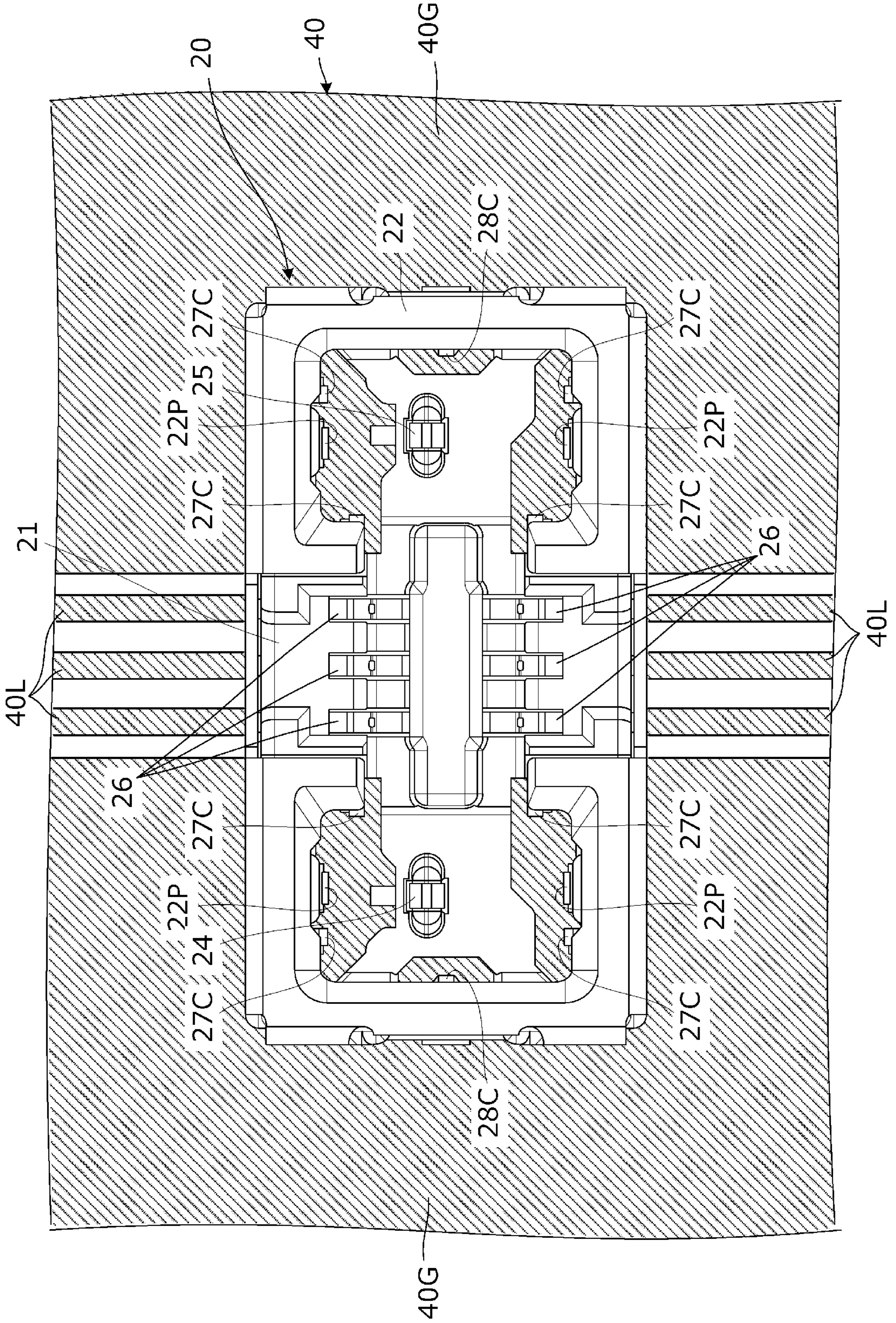
FIG. 6 is a plan view of the second connector mounted on the second circuit substrate.

FIG. 5 is a sectional view of an electronic circuit device 201 in a state in which a first circuit substrate 30 and a second circuit substrate 40 are coupled via the connector set 101. FIG. 6 is a plan view of the second connector 20 mounted on the second circuit substrate 40. As illustrated in FIG. 6, a ground conductor 40G planarly extending is formed on a portion of the second circuit substrate 40 on which the second connector 20 is mounted. Further, a signal line 40L, to which the second internal terminal 26 is connected, is formed on the second circuit substrate 40. The ground conductor 40G and the signal line 40L are hatched in FIG. 6. In a state in which the first connector 10 and the second connector 20 are fitted to each other, the first external terminals 12 and 13 of the first connector 10 and the ground conductor 40G overlap with each other in plan view (viewed from insertion-removal direction). The second internal terminal 24 of the second connector 20 and the second internal terminal 25 of the second connector 20 are connected to mounting electrodes isolated from the ground conductor 40G. The mounting electrodes are electrically connected to signal wiring lines under the ground conductor 40G via interlayer connection conductors.

The electronic circuit device 201 includes the first circuit substrate 30, the second circuit substrate 40, the first connector 10 mounted on the first circuit substrate 30, and the second connector 20 mounted on the second circuit substrate 40. The second connector 20 fits to the first connector 10 to and from which the second connector 20 is insertable and removable in the insertion-removal direction. A ground conductor 30G extending over a predetermined range is formed on the surface of the first circuit substrate 30 on which the first connector 10 is mounted. The ground conductor 40G extending over a predetermined range is formed on the surface of the second circuit substrate 40 on which the second connector 20 is mounted.

In the orientation illustrated in FIG. 1, FIG. 2, and FIG. 3, the lower surfaces of the first external terminals 12 and 13 of the first connector 10 are connected to the ground conductor 30G of the first circuit substrate 30. In the orientation illustrated in FIG. 1, FIG. 2, and FIG. 4, the lower surface of the second external terminal 22 of the second connector 20 is connected to the ground conductor 40G of the second circuit substrate 40. The mount portions 27T and 28T of the ground terminals 27 and 28 are also connected to the ground conductor 40G.

In a state in which the second connector 20 is fitted to the first connector 10, the contact portion 24C of the second internal terminal 24 of the second connector 20 is fitted to the contact portion 14C of the first internal terminal 14 of the first connector 10. Similarly, the contact portion 25C of the second internal terminal 25 of the second connector 20 is fitted to the contact portion 15C of the first internal terminal 15 of the first connector 10. Further, the contact portions 16C of the six first internal terminals 16 of the first connector 10 are fitted to the respective contact portions 26C of the six second internal terminals 26 of the second connector 20.

The two contact portions 28C of the ground terminal 28 of the second connector 20 are engaged with respective engagement portions (recessed portions) of the outer side surfaces of the first external terminals 12 and 13 of the first connector 10. The contact portions 27C of the four ground terminals 27 illustrated in FIG. 4 are also engaged with respective engagement portions (recessed portions) of the outer side surfaces of the first external terminals 12 and 13 of the first connector 10.

In the orientation illustrated in FIG. 5, the upper surfaces of the first external terminals 12 and 13 of the first connector 10 face the ground conductor 40G of the second circuit substrate 40. As the thickness of the second connector 20 is reduced, a facing distance d between the upper surfaces of the first external terminals 12 and 13 of the first connector 10, and the ground conductor 40G of the second circuit substrate 40 decreases. For example, the fitting depth of the first connector 10 and the second connector 20 is approximately 0.6 mm, and the facing distance d is approximately 0.1 mm.

The first external terminals 12 and 13 are not directly connected to the ground conductor 40G. The second insulation member 21 is provided between the first external terminals 12 and 13, and the ground conductor 40G. That is, the first external terminals 12 and 13 face the ground conductor 40G with the second insulation member 21 interposed therebetween.

Note that, without being limited to the above-described example, the first external terminals 12 and 13 may directly face the ground conductor 40G. However, the cutout portions 12N and 13N are preferably formed in portions facing the ground 40G with the second insulation member 21 interposed therebetween.

Further, the cutout portions 12N and 13N are cut out in the side of the mounting surface of the second circuit substrate 40 on which the second connector 20 is mounted. The cutout portions 12N and 13N are formed to be recessed also in a planar direction perpendicular to the thickness direction of the connector. As described above, the cutout portions 12N and 13N are formed to reduce the area overlapping with the ground conductor also in the planar direction perpendicular to the thickness direction.

In the present embodiment, as illustrated in FIG. 3, the cutout portions 12N and 13N are formed in the first external terminals 12 and 13. This reduces the facing area of the upper surface of the first external terminals 12 and 13 of the first connector 10 and the ground conductor 40G of the second circuit substrate 40, in comparison with a structure in which the cutout portions 12N and 13N are not formed. With this, the parasitic capacitance generated in the facing portion is suppressed. As a result, the frequency of resonance (first parasitic resonance) of a parasitic resonance circuit including the parasitic capacitance increases, and unnecessary resonance in an operating frequency band is prevented.

The cutout portions 12N and 13N constitute a resonance space of second parasitic resonance in the width direction and the depth direction thereof. Since both ends in the width direction are short-circuited (fixed) ends, the width is ½ or less of the wavelength of a signal propagating through a transmission path formed by the first external terminals 12 and 13, the first internal terminals 14 and 15, and the first insulation member 11. Further, since one end is an open end and the other end is a short-circuited (fixed) end in the depth direction, the depth is ¼ or less of the wavelength of a signal propagating through a transmission path formed by the first external terminals 12 and 13, the first internal terminals 14 and 15, and the first insulation member 11. With this, the frequency of parasitic resonance (second parasitic resonance) generated in the width direction or the depth direction of the space formed by the cutout portions 12N and 13N is higher than the frequency band of the above-described propagation signal. Accordingly, there is no adverse effect due to the second parasitic resonance.

Further, in the present embodiment, the first connector 10 has retaining portions 12R and 13R (see FIG. 1) on the outer periphery of the first external terminals 12 and 13, and the second connector 20 has an engaging protrusion 22P that engages with the retaining portions 12R and 13R on the inner periphery of the second external terminal 22. The engaging protrusion 22P has spring properties. Further, the second connector 20 has the contact portions 27C and 28C (see FIG. 2) of the ground terminals, and the first connector 10 has contact portions 12S and 13S (see FIG. 1) with which the contact portions 27C and 28C of the ground terminals are in contact on the outer periphery of the first external terminals 12 and 13.

Mechanical fitting is achieved by the engagement between the retaining portions 12R and 13R, and the engaging protrusions 22P. After the first connector 10 and the second connector 20 are fitted to each other, a state is kept in which it is hard to separate the both. Further, the contact of the contact portions 27C and 28C of the ground terminal, and the contact portions 12S and 13S of the first external terminals 12 and 13 makes the contact portions 27C and 28C of the ground terminal, and the contact portions 12S and 13S of the first external terminal be electrically coupled to each other.

Such a structure for separately realizing mechanical fitting and electrical contact provides the following effects.

(1) The ground terminals 27 and 28 may be set to have a shape and a plate thickness that are unlikely to be plastically deformed, and reliable electrical coupling may be achieved.

(2) The engaging protrusion 22P of the second external terminal 22 may be formed to have a shape and a plate thickness that may obtain a spring constant (clamping force) necessary for fitting (locking).

(3) The shape of each of the engaging protrusion 22P of the second external terminal 22, and the retaining portions 12R and 13R of the first external terminals 12 and 13 may provide a guiding function to guide the both to an engaging position.

(4) The contact portions 27C and 28C may be formed in the vicinity of the mount portions 27T and 28T of the ground terminals 27 and 28 (position close to soldering portion). With this, the distances between the ground conductor 40G of the second circuit substrate 40 and the first external terminals 12 and 13 are reduced, and thus, the inductance component of the parasitic resonance circuit decreases. As a result, the resonant frequency may be shifted to a higher frequency side.

Further, in the present embodiment, as illustrated in FIG. 2, the second external terminal 22 has a discontinuous portion 22D in the periphery along the peripheral direction of the first external terminals 12 and 13, in a state in which the first connector 10 is fitted to the second connector 20. In the present embodiment, the discontinuous portion 22D of the second external terminal 22 is provided at a portion positioned between the two first external terminals 12 and 13, and the second external terminal 22 has a C-shape in plan view. With this, of the distances between the adjacent contact portions of the contact portions 27C and 28C of the plurality of ground terminals, the distance between the contact portions 27C and 27C in the discontinuous portion 22D is large. This is to prevent interference between the second external terminal 22 of the second connector 20 and the first insulation member 11 of the first connector 10.

As described above, the electric potential of the ground conductor 40G of the second circuit substrate 40 varies from the ground electric potential at a portion where the distance between the adjacent ground terminals is large. In other words, the inductance component becomes large at the portion of the ground conductor 40G where the distance between the adjacent ground terminals is large. With this, the resonant frequency of the parasitic resonance circuit may lower due to: the parasitic capacitance between the portion of the ground conductor having a large inductance component and the first external terminals 12 and 13 of the first connector 10, and the above-described large inductance component. This may make the resonant frequency enter an operating frequency band.

Whereas, in the present embodiment, the first external terminals 12 and 13 are configured to surround the two respective portions of the first insulation member 11. The cutout portions 12N and 13N, of the two first external terminals 12 and 13 that surround the two portions of the first insulation member 11, are formed at portions where the two first external terminals 12 and 13 face each other. That is, the cutout portions 12N and 13N are formed at positions of the first external terminals 12 and 13 facing the portion (portion indicated by 22D in FIG. 2) where the distance between adjacent ground terminals is large. As a result, the resonant frequency of the parasitic resonance circuit may effectively be increased by reducing the capacitance component at the portion where the inductance component becomes large, that is, the portion where the distance between ground terminals is long and an electric voltage drop is likely to occur.

Although the second external terminal 22 and the ground terminals 27 and 28 illustrated in FIG. 4 are not in contact with each other in the example described above, the second external terminal 22 and the ground terminals 27 and 28 may be configured to be in contact with each other. In a case where the second external terminal 22 and the ground terminals 27 and 28 are in contact with each other, a large number of conductors having ground electric potential (ground terminals 27 and 28, and second external terminal 22) are connected to the ground conductor 40G of the second circuit substrate 40. As a result, it is possible to reduce the inductance component constituting the parasitic resonance circuit together with the parasitic capacitance between the ground conductor 40G of the second circuit substrate 40 and the first external terminals 12 and 13 of the first connector 10.

Note that, in a case where the second external terminal 22 and the ground terminals 27 and 28 are independent without being in electrical contact with each other, there is an effect that flexibility in designing the spring properties of the engaging protrusion 22P of the second external terminal 22 is high.

In the first embodiment, in FIG. 5, described is the generation of parasitic capacitance in the facing portion between the upper surface of the first external terminals 12 and 13 of the first connector 10 and the ground conductor 40G of the second circuit substrate 40. Similarly, parasitic capacitance may be generated in the facing portion between the upper surface of the second external terminal 22 of the second connector 20 and the ground conductor 30G of the first circuit substrate 30. Accordingly, by forming the cutout portion in the second external terminal 22 of the second connector 20, the parasitic capacitance generated in the facing portion between the upper surface of the second external terminal 22 of the second connector 20 and the ground conductor 30G of the first circuit substrate 30 may be reduced.

Second Embodiment

In a second embodiment, a connector set including a plurality of cutout portions in each of the first external terminals 12 and 13 will be described.

Figure 7:
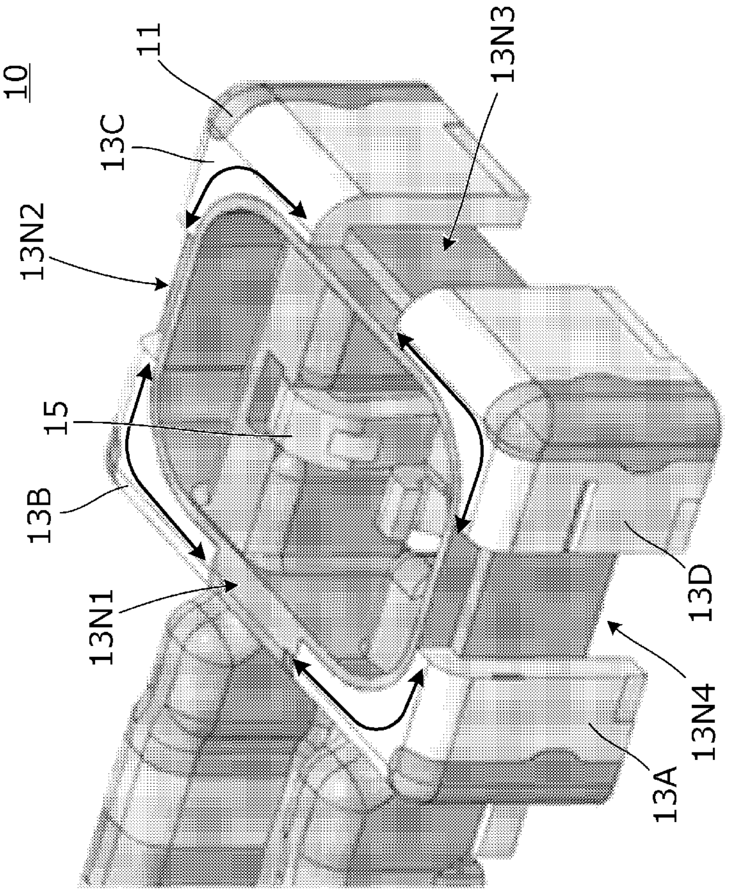
FIG. 7 is a partial perspective view of the first connector according to a second embodiment.

FIG. 7 is a partial perspective view of the first connector 10 according to the second embodiment. The first external terminal is constituted of four first external terminals 13A, 13B, 13C, and 13D. The first external terminals 13A, 13B, 13C, and 13D cover the first insulation member 11. A cutout portion 13N1 is formed between the first external terminal 13A and the first external terminal 13B, a cutout portion 13N2 is formed between the first external terminal 13B and the first external terminal 13C, a cutout portion 13N3 is formed between the first external terminal 13C and the first external terminal 13D, and a cutout portion 13N4 is formed between the first external terminal 13D and the first external terminal 13A.

In the present embodiment, each of the cutout portions 13N1, 13N2, 13N3, and 13N4 is formed over an entire depth direction. That is, the four first external terminals 13A, 13B, 13C, and 13D are independent of each other. The width of the cutout portions 13N1, 13N2, 13N3, and 13N4 is ½ or less of the wavelength of a signal propagating through the transmission path formed by the first external terminal 13, the first internal terminal 15, and the first insulation member 11. The depth of the cutout portions 13N1, 13N2, 13N3, and 13N4 is ¼ or less of the wavelength of a signal propagating through the transmission path formed by the first external terminal 13, the first internal terminal 15, and the first insulation member 11. With this, the frequency of the second parasitic resonance generated in the width direction or the depth direction of the space formed by the cutout portions 13N1, 13N2, 13N3, and 13N4 may be made higher than the frequency band of the above-described propagation signal. Accordingly, the first connector 10 of the present embodiment may suppress the influence of the second parasitic resonance. Further, since the width and the depth of the cutout portions 13N2, 13N3, and 13N4 are ½ or less of the wavelength of a signal propagating through the transmission path formed by the first external terminal 13, the first internal terminal 15, and the first insulation member 11, the first connector 10 of the present embodiment may suppress unnecessary radiation to the outside.

Further, in the present embodiment, of the cutout portions along the periphery of the surrounding in each of the first external terminals 13A, 13B, 13C, and 13D, the distance between the cutout portions adjacent along the periphery of the surrounding is ½ or less of the wavelength of a signal. That is, in FIG. 7, the distance indicated by a curve with arrowheads at both ends is ½ or less of the wavelength of a signal. As a result, the resonant frequency of a third parasitic resonance, which is the resonance generated in the periphery of the surrounding, of each of the first external terminals 13A, 13B, 13C, and 13D may be made higher than the frequency band of a signal. Accordingly, the first connector 10 of the present embodiment may suppress the influence of the parasitic resonance (third parasitic resonance).

Although the configuration of one end of the first connector 10 is illustrated in FIG. 7, the other end may also be configured similarly, and the same effect may be achieved.

Third Embodiment

In a third embodiment, a connector set is described in which the contact portion 27C of the ground terminal 27 is formed at a portion different from that in the first embodiment.

Figure 8:
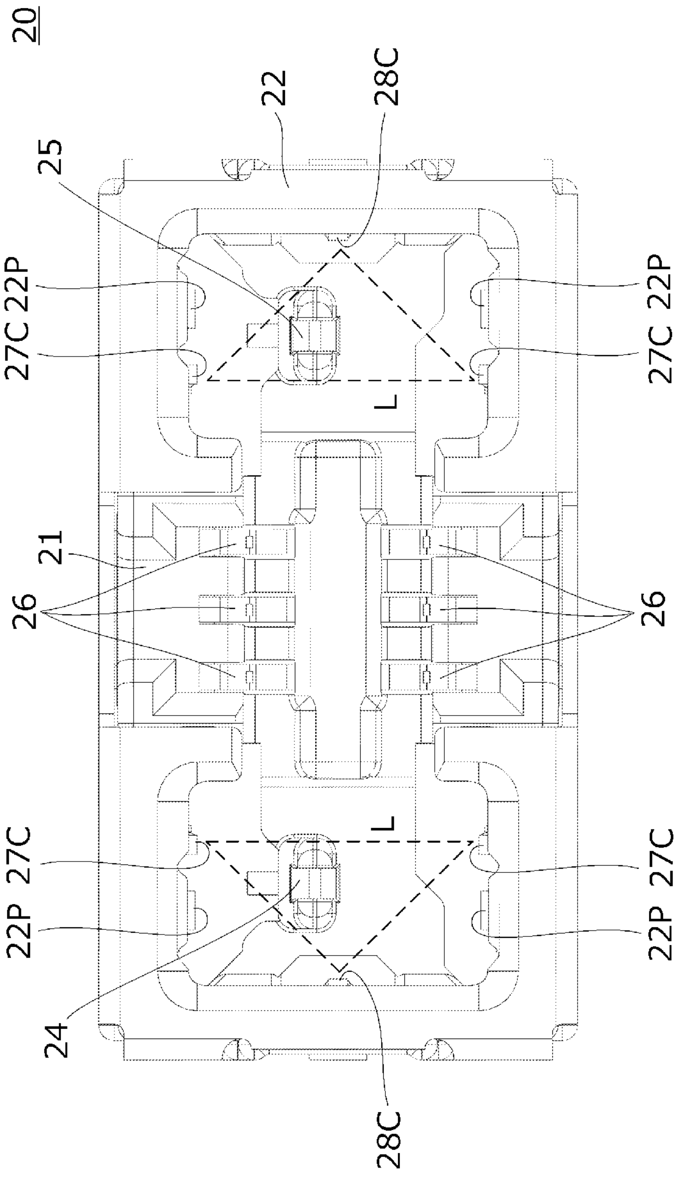
FIG. 8 is a plan view of the second connector according to a third embodiment.
Figure 9:
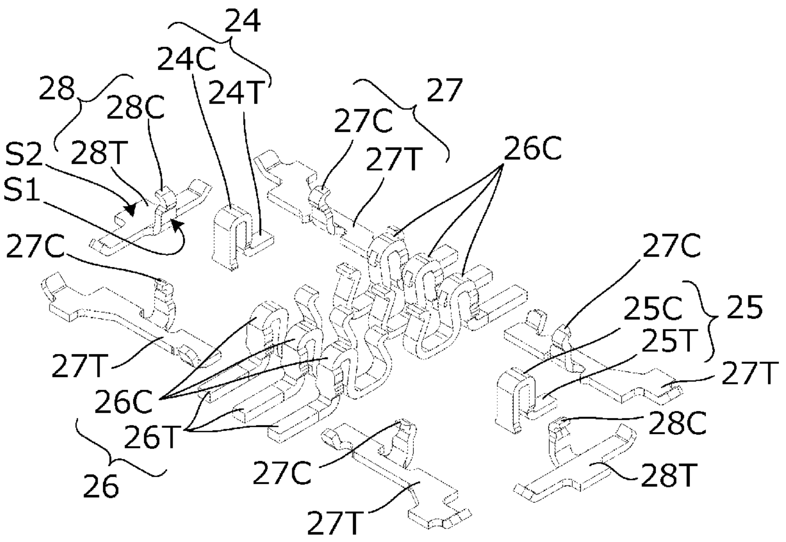
FIG. 9 is a perspective view of second internal terminals, and ground terminals of the second connector according to the third embodiment.

FIG. 8 is a plan view of the second connector 20 according to the third embodiment. FIG. 9 is a perspective view of the second connector 20 according to the third embodiment illustrating the second internal terminals 24, 25, and 26, and the ground terminals 27 and 28. In plan view, the two contact portions 27C of the ground terminal 27 are provided inside the C-shaped portion in one side of the second external terminal 22, and the two contact portions 27C of the ground terminal 27 are provided inside the C-shaped portion in the other side of the second external terminal 22. The contact portions 27C of the ground terminal 27 are not disposed in the vicinity of the end portion of the C-shaped portion of the second external terminal 22, but are disposed to face each other in the lateral direction of the second connector 20 in plan view. As indicated by a broken line L, the contact portions 27C of the ground terminal 27 are disposed to surround the second internal terminal 24 or the second internal terminal 25 together with the contact portion 28C of the ground terminal 28 in plan view. In other words, the second internal terminals 24 and 25 are surrounded by three line segments connecting the two contact portions 27C and the single contact portion 28C in plan view.

The first connector 10 according to the third embodiment is configured similarly to the first connector 10 according to the first embodiment except for the portions where the contact portions 12S and 13S of the first external terminals 12 and 13 are formed (see FIG. 1). The contact portions 12S and 13S of the first external terminals 12 and 13 are formed to be in contact with the contact portions 27C of the ground terminals 27 and the contact portions 28C of the ground terminals 28 in a state in which the first connector 10 and the second connector 20 are fitted to each other.

In a state in which the first connector 10 and the second connector 20 are fitted to each other, a mounting surface S1 (surface part of which is mounted) is extended from the mount portion 28T to the contact portion 28C while being kept to face the outer periphery of the first external terminals 12 and 13, and the ground terminal 28 is in contact with the first external terminals 12 and 13. Thus, the length from the mount portion 28T to the contact portion 28C may be made shorter than that in the following cases. A ground terminal has a shape in which the ground terminal is coupled to the first external terminals 12 and 13 at the surface (opposing mounting surface S2) opposed to the mounting surface S1, or a ground terminal has a shape in which the ground terminal is coupled to the first external terminals 12 and 13 at the mounting surface S1 while changing the surface facing the first external terminals 12 and 13 from the mount surface S1 to the opposing mounting surface S2 multiple times. This makes it possible to shorten the distance to where the first external terminals 12 and 13 are coupled to the ground.

In order to shift the frequency of the resonance (first parasitic resonance) of the above-described parasitic resonance circuit to a higher frequency side, it is necessary to increase the dimensions of the cutout portions 12N and 13N. As a result, it becomes impossible to dispose the contact portions 12S and 13S on the side surface of the first external terminals 12 and 13 where the cutout portions 12N and 13N are formed. Correspondingly, it becomes impossible to dispose the contact portions 27C of the ground terminals 27 in the vicinity of the end portion of the C-shaped portion of the second external terminal 22 in plan view (see FIG. 2 and FIG. 4).

In the present embodiment, the contact portions 27C of the ground terminal 27 are not disposed in the vicinity of the end portion of the C-shaped portion of the second external terminal 22, but are disposed to face each other in the lateral direction of the second connector 20. As a result, in the structure in which the contact portions 27C of the ground terminals 27 and the corresponding contact portions 12S and 13S of the first external terminals 12 and 13 are provided, the frequency of the first parasitic resonance may be shifted to a higher frequency side.

Further, in the present embodiment, the contact portions 27C of the ground terminals 27 are disposed to surround the second internal terminal 24 or the second internal terminal 25 together with the contact portion 28C of the ground terminal 28. As a result, also in the present embodiment, the second internal terminals 24 and 25 are shielded by the contact portions 27C of the ground terminals 27 and the contact portions 28C of the ground terminals 28, and thus unnecessary radiation to the outside may be suppressed.

Further, in the present embodiment, the contact portions 27C of the ground terminal 27 are disposed to face each other in the lateral direction of the second connector 20, and are elastically deformed in the lateral direction of the second connector 20. As a result, it is not necessary to ensure a space for the contact portions 27C of the ground terminals 27 to be elastically deformed in the longitudinal direction of the second connector 20, and thus the dimension of the second connector 20 in the longitudinal direction may be reduced.

Fourth Embodiment

In the fourth embodiment, there will be described a connector set in which a coupling structure of a second external terminal of a second connector to a first external terminal of a first connector is different from that of the examples described hereinbefore.

Figure 10:
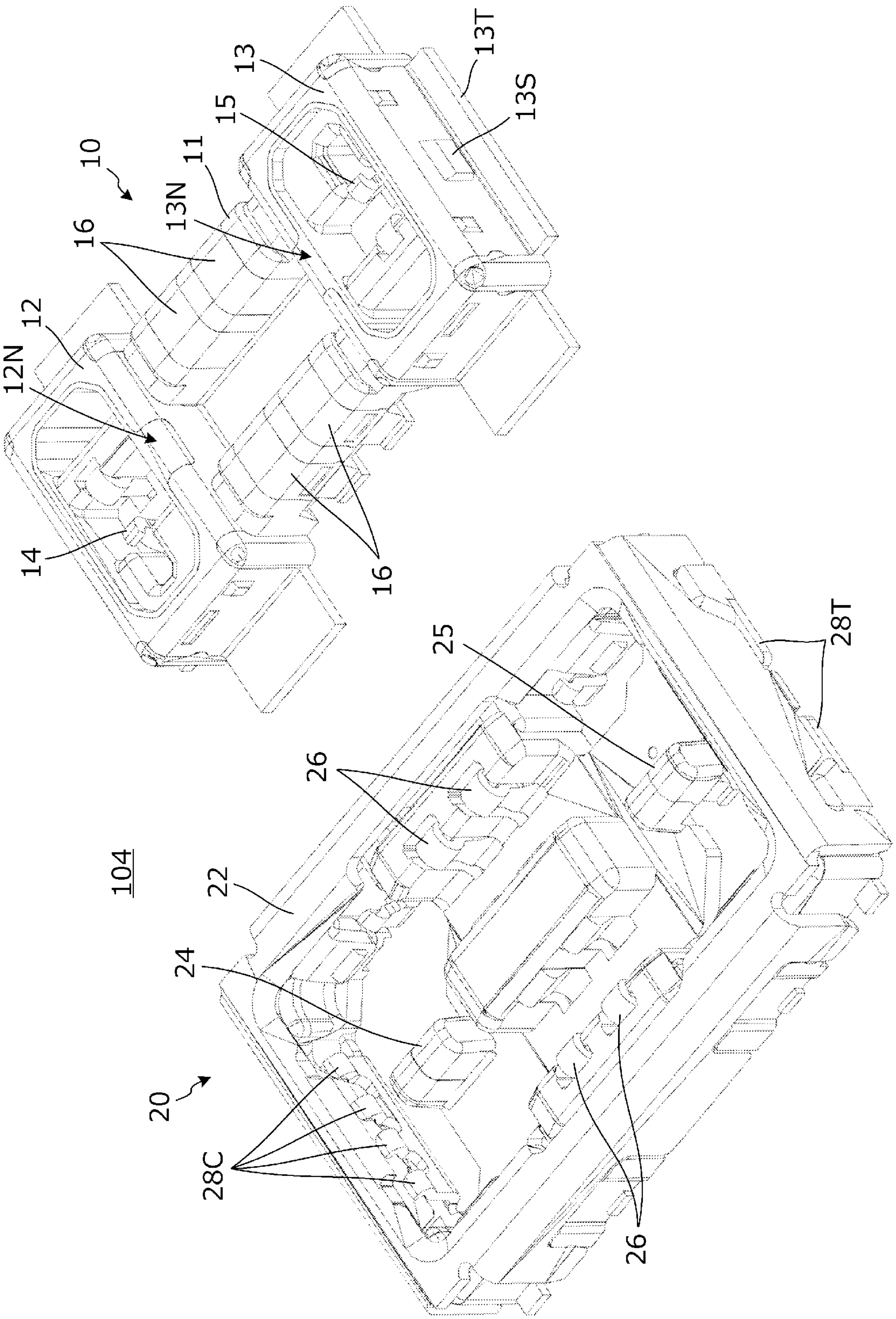
FIG. 10 is a perspective view of a connector set according to a fourth embodiment.
Figure 11:
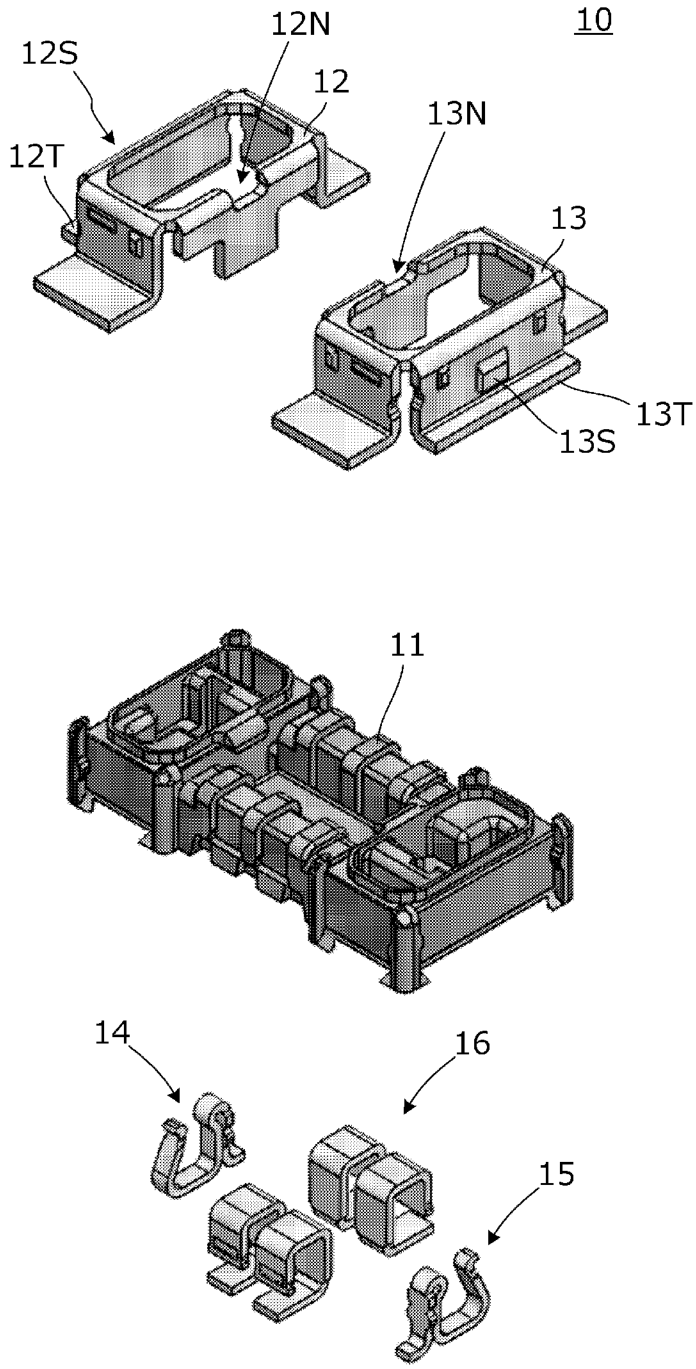
FIG. 11 is an exploded perspective view of the constituting components of the first connector in the connector set.
Figure 12:
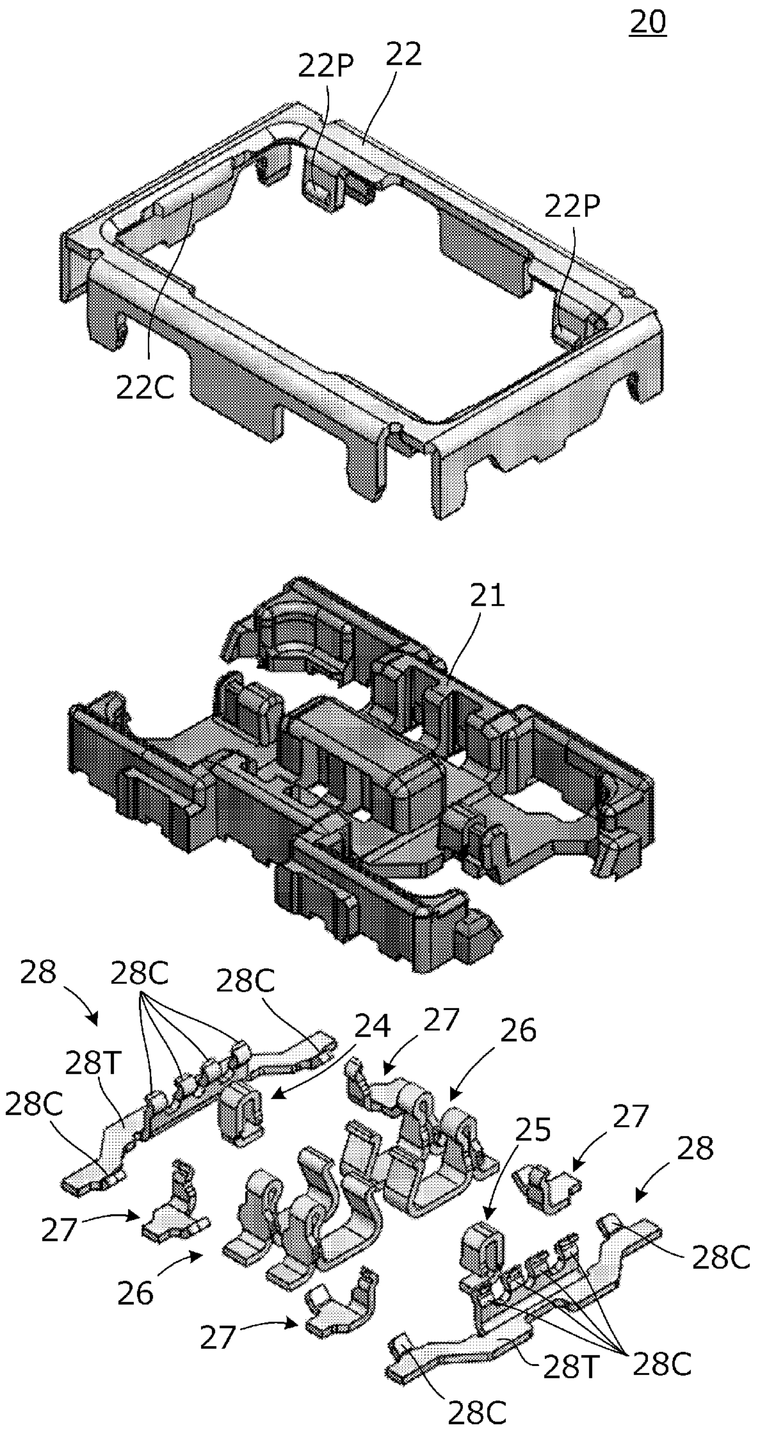
FIG. 12 is an exploded perspective view of the constituting components of the second connector in the connector set.

FIG. 10 is a perspective view of a connector set 104 according to a fourth embodiment. FIG. 11 is an exploded perspective view of the constituting components of the first connector 10 of the connector set 104, and FIG. 12 is an exploded perspective view of the constituting components of the second connector 20 of the connector set 104.

As in the connector sets that have been described, the connector set 104 is constituted of the first connector 10 and the second connector 20. As will be described later, the first connector 10 is mounted on a first circuit substrate to be used, and the second connector 20 is mounted on a second circuit substrate to be used. In FIG. 10, the first connector 10 is inserted into and removed from the second connector 20 in an upside-down state.

As illustrated in FIG. 11, the first connector 10 is constituted of the first external terminals 12 and 13, the first internal terminals 14, 15, and 16, and the first insulation member 11. In this respect, the basic configuration is the same as that of the connector set 101 described in the first embodiment. However, the mount portions of the first internal terminal 14 and the first internal terminal 15 are positioned at vertically different positions. Further, the mount portions of the second internal terminal 24 and the second internal terminal 25 are positioned at vertically different positions. With this, wiring lines connected to the internal terminals of the connector may be routed not only from one side but also from another side, and the degree of freedom of the layout of the board-side wiring is high.

Further, in a state in which the first connector 10 and the second connector 20 are fitted to each other, the first internal terminal 14 and the second internal terminal 24 are in contact with each other, and the first internal terminal 14 and the second internal terminal 24 are positioned closer to the contact portion 12S (contact portion on the side opposite to the contact portion 13S and similar to the contact portion 13S) than to the cutout portion 12N in the first external terminal 12. Similarly, in the fitted state, the first internal terminal 15 and the second internal terminal 25 are in contact with each other, and the first internal terminal 15 and the second internal terminal 25 are positioned closer to the contact portion 13S than to the cutout portion 13N in the first external terminal 13. In the connector set 104 described above, the internal terminals 14 and 24, and the internal terminals 15 and 25 are in proximity to the side surface where the contact portion 12S and the contact portion 13S are formed in the first external terminal 12 and the first external terminal 13. This makes it important to block noise at the side surface.

Each of the first external terminals 12 and 13 is a component formed by sheet metal processing, and is fitted into the first insulation member 11. In the first external terminal 12 in the orientation illustrated in FIG. 11, there is formed the cutout portion 12N recessed downward from the upper surface of the first external terminal 12. Similarly, in the first external terminal 13, there is formed the cutout portion 13N recessed downward from the upper surface of the first external terminal 13. The contact portions 12S and 13S are formed on the side surface of the first external terminals. In FIG. 11, the contact portion 13S is illustrated. Further, first external terminal mount portions 12T and 13T are formed on bottom surfaces (mounting surfaces on the first circuit substrate) of the first external terminals 12 and 13.

As illustrated in FIG. 12, the second connector 20 is constituted of the second external terminal 22, the second internal terminals 24, 25, and 26, the ground terminals 27 and 28, and the second insulation member 21. The two ground terminals 28 are constituted of the plurality of contact portions 28C and the mount portions 28T.

The second internal terminals 24, 25, and 26, and the ground terminals 27 and 28 are formed by sheet metal processing and are fitted into the second insulation member 21. In other words, the second internal terminals 24, 25, and 26, and the ground terminals 27 and 28 are held by the second insulation member 21.

The second external terminal 22 is a component formed by sheet metal processing, and is fitted into the second insulation member 21.

Figure 13:
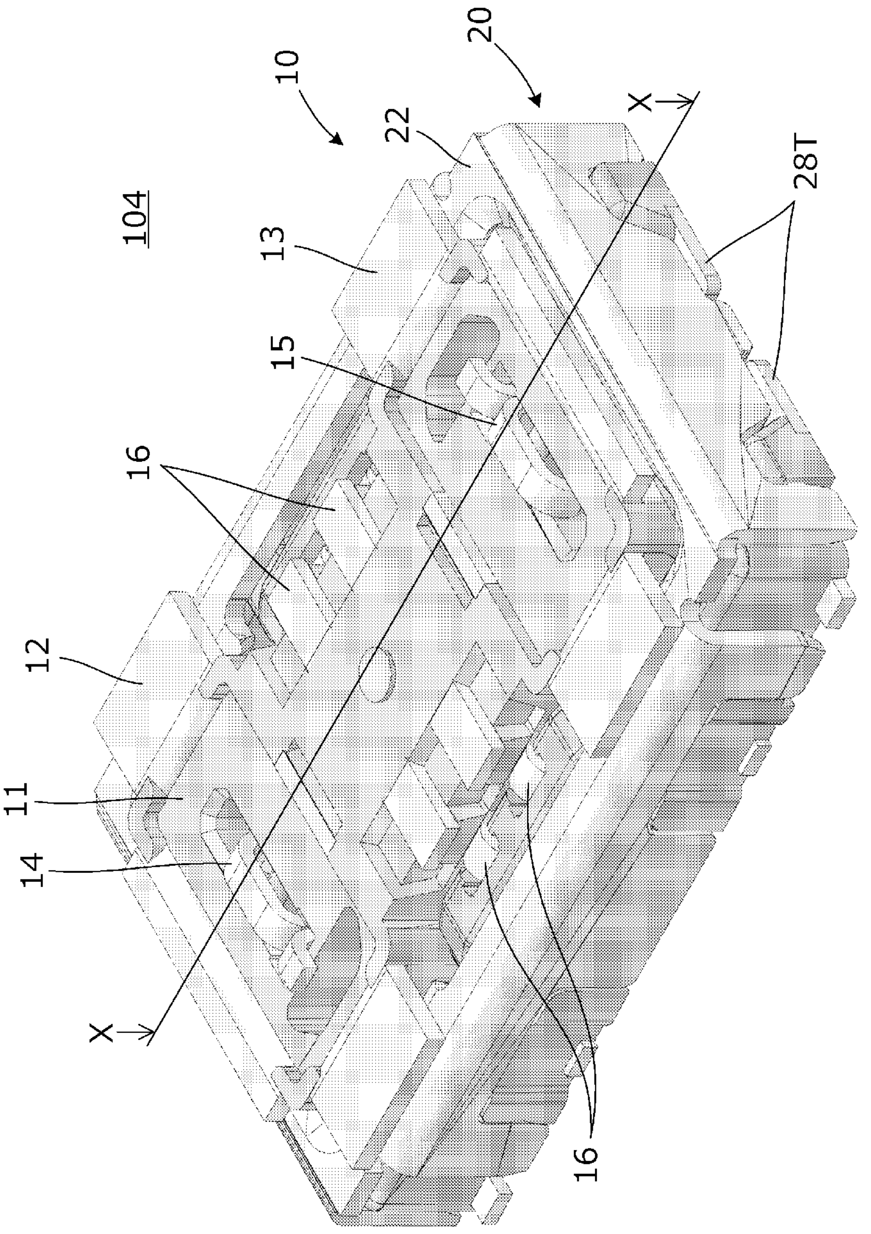
FIG. 13 is a perspective view of the connector set illustrating a sectional position in a state in which the first connector and the second connector are fitted to each other.
Figure 14:
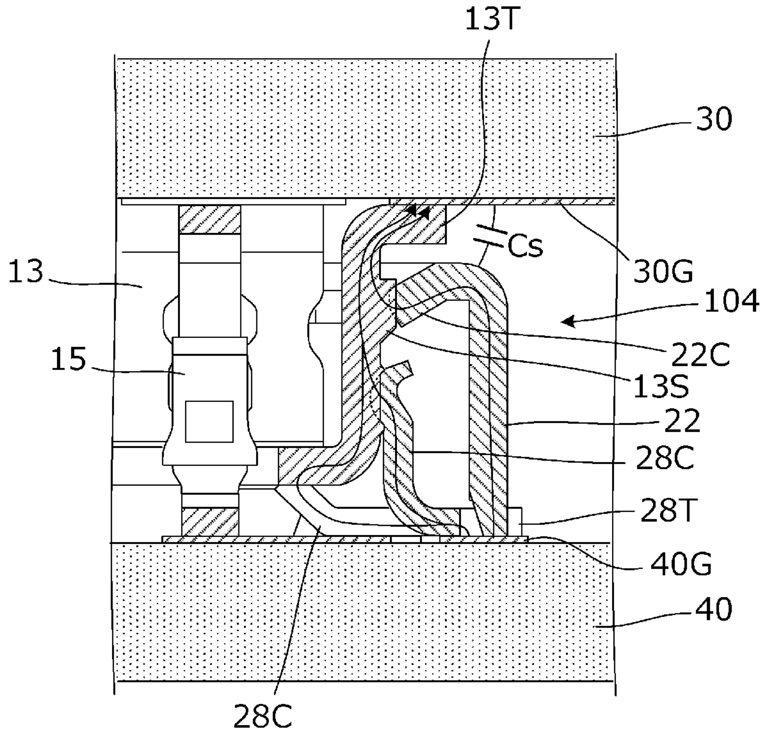
FIG. 14 is a partial sectional view taken along a line X-X in FIG. 13.

FIG. 13 is a perspective view of the connector set 104 viewed from the first connector 10 side in a state in which the first connector 10 and the second connector 20 are fitted to each other. Note that, for convenience of illustration, the first circuit substrate and the second circuit substrate are omitted. FIG. 14 is a partial sectional view taken along a line X-X in FIG. 13. Note that, the first insulation member 11 is omitted in the drawing.

In a state in which the first connector 10 and the second connector 20 are fitted to each other, as illustrated in FIG. 14, the contact portion 28C of the ground terminal 28 of the second connector 20 is in elastic contact with the side surface and the lower surface (upper surface in the direction illustrated in FIG. 10 and FIG. 11) of the first external terminal 13 of the first connector 10. Further, a contact portion 22C of the second external terminal 22 is in elastic contact with the contact portion 13S of the first external terminal 13 of the first connector 10. That is, as indicated by an arrow line in FIG. 14, the following path is configured as the first path of the ground electric current. [ground conductor 40G of second circuit substrate 40]-[mount portion 28T of ground terminal 28 of second connector 20]-[contact portion 28C]-[first external terminal 13]-[first external terminal mount portion 13T]-[ground conductor 30G of first circuit substrate 30]. The following path is configured as the second path of the ground electric current. [ground conductor 40G of second circuit substrate 40]-[second external terminal 22 of second connector 20]-[contact portion 22C of second external terminal 22]-[first external terminal 13]-

[first external terminal mount portion 13T]-[ground conductor 30G of first circuit substrate 30].

Further, since the contact portion 22C of the second external terminal 22 is in contact with the contact portion 13S of the first external terminal 13, the electric potential of the contact portion 22C of the second external terminal 22 does not deviate from the ground electric potential (becomes closer to the ground electric potential). This suppresses the parasitic capacitance Cs generated between the contact portion 22C of the second external terminal 22 and the ground conductor 30G of the first circuit substrate 30. In the present embodiment, the contact of the first external terminal 13 and the second external terminal 22 is achieved by making the contacting portions to protrude. With this, an unnecessary portion is not thickened, and impairment of the workability of the external terminal may be prevented.

Figure 15:
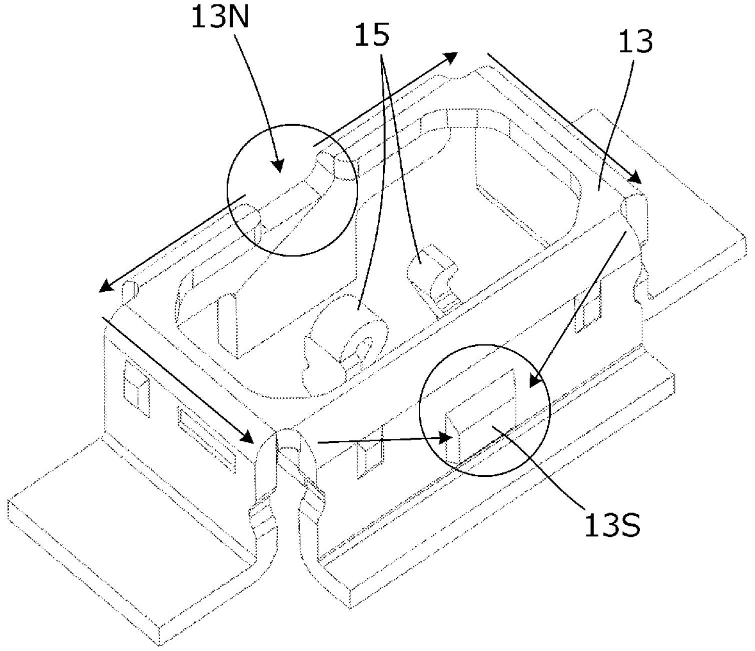
FIG. 15 is a perspective view of the first external terminal of the first connector in the connector set.

FIG. 15 is a perspective view of the first external terminal 13 of the first connector 10. In the present embodiment, the contact portion 13S of the first external terminal 13 is positioned facing the cutout portion 13N with the first internal terminal 15 interposed therebetween when viewed in the insertion-removal direction of the connector. An arrow in FIG. 15 indicates an electric current path between the cutout portion 13N and the contact portion 13S. As described above, since the contact portion 13S and the cutout portion 13N of the first external terminal 13 are positioned facing each other with the first internal terminal 15 interposed therebetween, the path lengths of substantially two electric current paths flowing along the outer periphery of the first external terminal 13 may be made approximately equal to each other. Although the first external terminal 13 is illustrated in FIG. 15, the same applies to another first external terminal 12. As described above, in the first external terminals 12 and 13 of the first connector 10, the path lengths of substantially two electric current paths flowing along the outer peripheries of the first external terminals 12 and 13 may be made approximately equal to each other. As a result, the first external terminals 12 and 13 of the first connector 10 may minimize the path lengths of the two electric current paths. With this, even when unnecessary resonance is generated, the frequency thereof may be set high. Further, since the path lengths of the two electric current paths may be made substantially equal to each other in the first external terminals 12 and 13 of the first connector 10, large amounts of unnecessary resonance do not occur. This makes it unlikely that the first external terminals 12 and 13 of the first connector 10 will be influenced by unnecessary resonance.

According to the present embodiment, the following effects are achieved.

(1) The contact portion 22C of the second external terminal 22 illustrated in FIG. 14 is brought into contact with the first external terminal 13, and thus roughly two ground electric current paths are formed, and the ground electric current paths coupling the ground conductor of the first circuit substrate 30 and the ground conductor of the second circuit substrate 40 are multiplexed. This suppresses unnecessary coupling between the connector set 104 and the outside, and unnecessary radiation. With this, the radiation of noise is reduced, for example.

(2) The parasitic capacitance generated between the contact portion 22C of the second external terminal 22 and the ground conductor 30G of the first circuit substrate 30 may be suppressed even in the portion of the first external terminals 12 and 13 where the cutout portions 12N and 13N are not present. This increases the resonant frequency of the parasitic resonance circuit including the parasitic capacitance, and prevents unnecessary resonance in an operating frequency band.

(3) As illustrated in FIG. 15 and the like, by determining the positional relationship between the cutout portion 13N and the contact portion 13S, the frequency of unnecessary resonance may be set high and the number of generated unnecessary resonance may be reduced. This makes it unlikely to have the influence of unnecessary resonance.

Fifth Embodiment

In a fifth embodiment, there will be exemplified an electronic circuit device in which isolation is enhanced with a connector set mounted on a circuit substrate in a fitted state.

Figure 16:
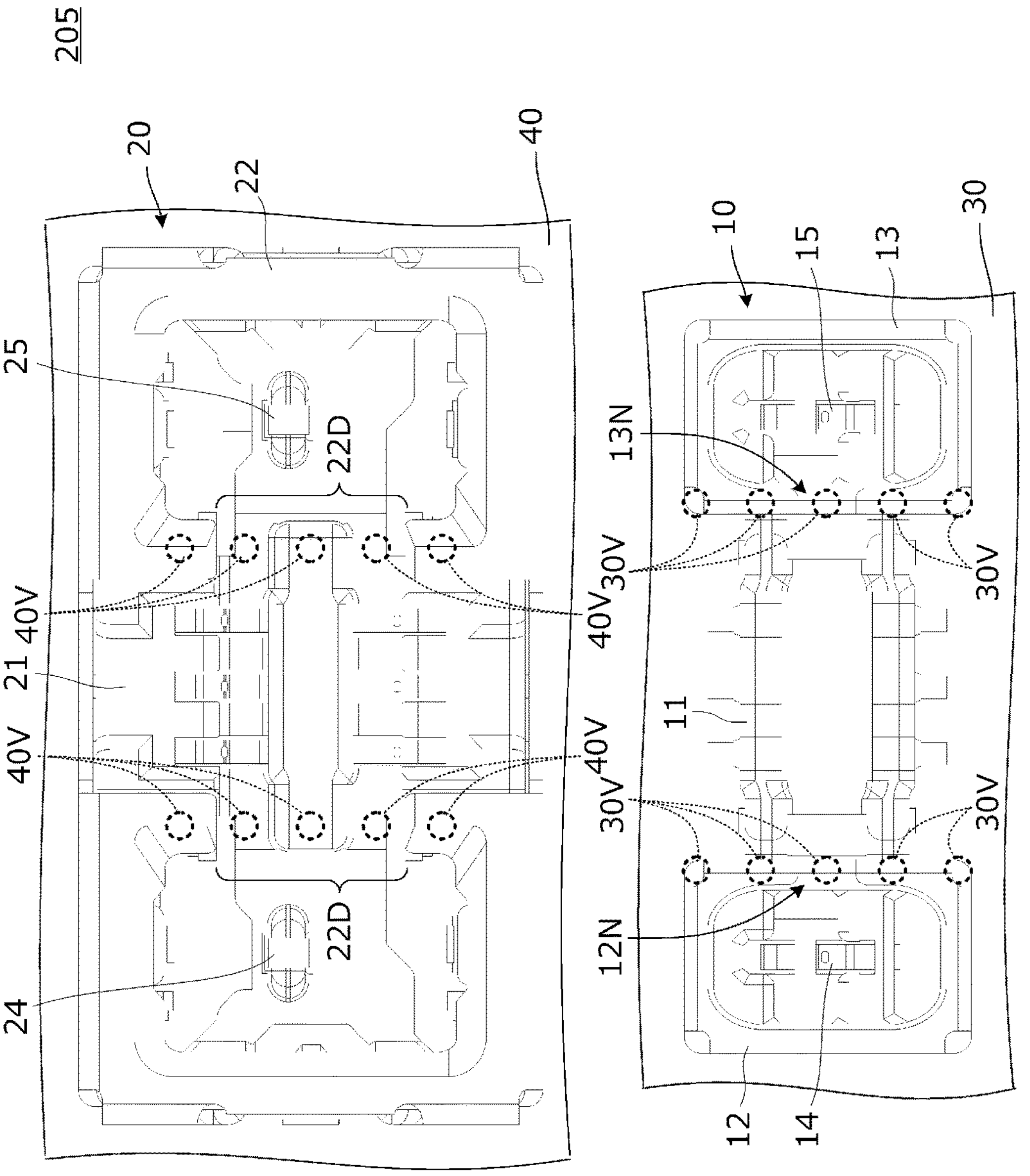
FIG. 16 is a plan view of an electronic circuit device according to a fifth embodiment in a state in which the connector set is separated.
Figure 17:
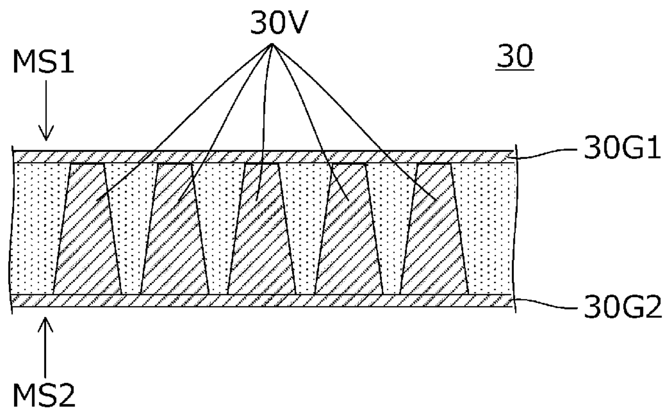
FIG. 17 is a partial sectional view of the first circuit substrate included in the electronic circuit device according to the fifth embodiment.

FIG. 16 is a plan view of an electronic circuit device 205 according to the fifth embodiment in a state in which the connector set is separated. FIG. 17 is a partial sectional view of the first circuit substrate 30 included in the electronic circuit device 205 according to the fifth embodiment. A connector set included in the electronic circuit device 205 is the same as the connector set 101 described in the first embodiment. That is, the configuration of the first connector 10 and the second connector 20 is as described in the first embodiment.

In FIG. 16, a plurality of interlayer connection conductors 30V indicated by broken lines is formed in the first circuit substrate 30 on which the first connector 10 is mounted. A plurality of interlayer connection conductors 40V indicated by broken lines is formed in the second circuit substrate 40 on which the second connector 20 is mounted.

As illustrated in FIG. 17, the first circuit substrate 30 includes a first ground conductor 30G1 formed on a first surface MS1 which is the mounting surface of the first connector 10, a second ground conductor 30G2 formed on a second surface MS2 opposed to the first surface, and the plurality of interlayer connection conductors 30V for connecting the first ground conductor 30G1 and the second ground conductor 30G2. The arrangement interval of the interlayer connection conductors 30V is narrower than ½ of the wavelength of the frequency to be blocked. With this structure, the arranged interlayer connection conductors 30V act as a perfect electric conductor (PEC), and an electromagnetic field that leaks from the connector and is likely to propagate in the first circuit substrate 30 is blocked.

Figure 18:
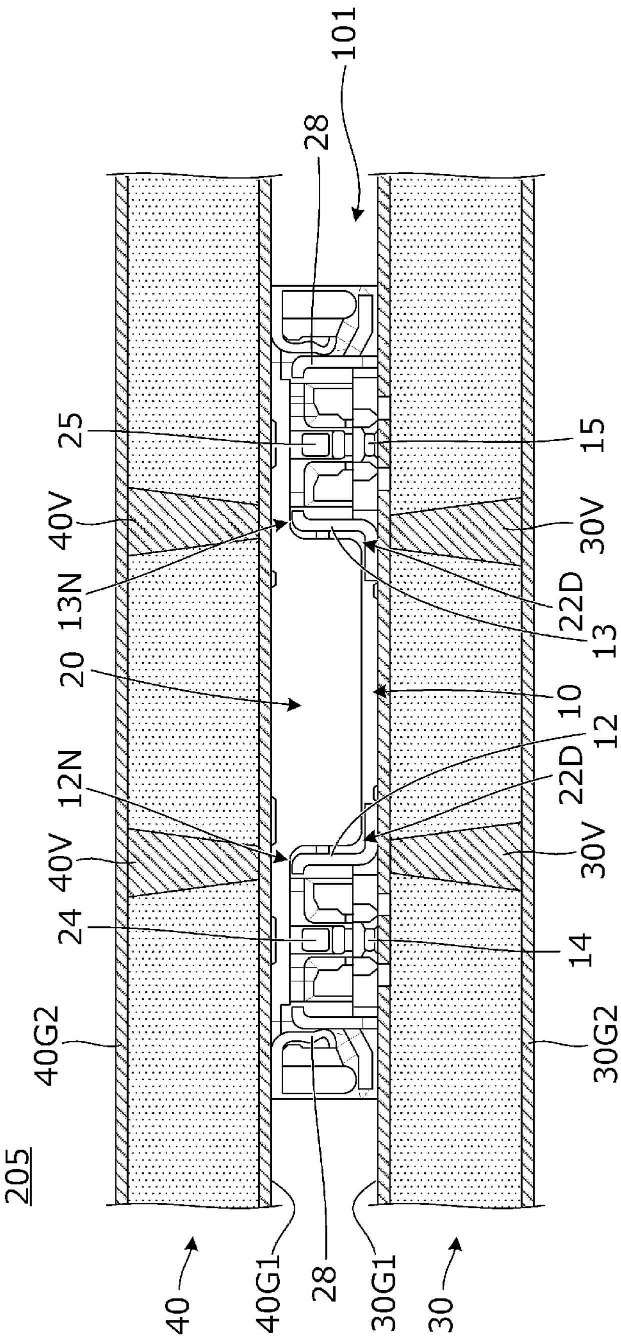
FIG. 18 is a sectional view of the electronic circuit device according to the fifth embodiment.

FIG. 18 is a sectional view of the electronic circuit device 205 taken along a plane passing through the first internal terminals 14 and 15, and the second internal terminals 24 and 25 of the connector set 101. The interlayer connection conductors 30V for connecting between the ground conductors 30G1 and 30G2 are formed in the first circuit substrate 30, and the interlayer connection conductors 30V are arranged at positions facing the cutout portions 12N and 13N of the first connector 10 when viewed in the insertion-removal direction. Here, the term "facing" means not only a state in which the interlayer connection conductors 30V completely overlap with the cutout portions 12N and 13N when viewed in the insertion-removal direction of the connector, but also a state in which the interlayer connection conductors 30V proximately face the cutout portions 12N and 13N. For example, the term "facing" includes: a state in which the interlayer connection conductor 30V faces the cutout portions 12N and 13N in a proximity range within three times the diameter of the interlayer connection conductor 30V; a state in which the interlayer connection conductor 30V faces the cutout portions 12N and 13N in a proximity range of ½ or less of the wavelength of a signal propagating through a transmission path formed by the first external terminals 12 and 13, the first internal terminals 14 and 15, and the first insulation member 11; and the like.

The interlayer connection conductor 40V formed on the second circuit substrate 40 illustrated in FIG. 16 connects a first ground conductor 40G1 formed on the first surface which is the mounting surface of the second connector 20, and a second ground conductor 40G2 formed on the second surface of the second circuit substrate 40 opposed to the first surface. The interlayer connection conductor 40V is arranged at a position facing the discontinuous portion 22D of the second external terminal 22 when viewed in the insertion-removal direction of the connector. The arrangement state of the interlayer connection conductors 40V is the same as that in the example illustrated in FIG. 17. With this structure, the arranged interlayer connection conductors 40V act as a PEC, and an electromagnetic field that leaks from the connector and propagates in the second circuit substrate 40 is blocked.

Also in the second circuit substrate 40, the term "facing" means not only a state in which the interlayer connection conductors 40V completely overlap with the discontinuous portions 22D of the second external terminal 22, but also a state in which the interlayer connection conductors 40V proximately face the discontinuous portions 22D of the second external terminal 22, when viewed in the insertion-removal direction of the connector. For example, included is a state in which the interlayer connection conductor 40V faces the discontinuous portion 22D of the second external terminal 22 in a proximity range within three times the diameter of the interlayer connection conductor 40V.

In the example illustrated in FIG. 17 and FIG. 18, the first circuit substrate 30 having the first ground conductor 30G1 formed on the first surface MS1 and the second ground conductor 30G2 formed on the second surface MS2 is illustrated. However, a ground conductor may be formed in an inner layer of the first circuit substrate 30, and the interlayer connection conductor 30V for connecting the ground conductor in the inner layer and the first ground conductor 30G1 on the first surface may be provided. The same applies to the second circuit substrate 40. A ground conductor may be formed in an inner layer of the second circuit substrate 40, and the interlayer connection conductor 40V for connecting the ground conductor in the inner layer and the first ground conductor 40G1 on the first surface may be provided.

As described above, by arranging the interlayer connection conductors for connecting between the ground conductors in the first circuit substrate 30 on which the first connector 10 is mounted, an electromagnetic field propagating in the first circuit substrate 30 is blocked. Similarly, by arranging the interlayer connection conductors for connecting between ground conductors in the second circuit substrate 40 on which the second connector 20 is mounted, an electromagnetic field propagating in the second circuit substrate 40 is blocked. With this, as described below, the isolation between two transmission paths, which are configured in the connector set, of signals (electromagnetic waves) such as millimeter waves is further ensured.

A first signal path is formed by the first internal terminal 14 of the first connector 10, the second internal terminal 24 of the second connector 20, the first external terminal 12 of the first connector 10, and the second external terminal 22 of the second connector 20 of the connector set. A second signal path is formed by the first internal terminal 15 of the first connector 10, the second internal terminal 25 of the second connector 20, the first external terminal 13 of the first connector 10, and the second external terminal 22 of the second connector 20 of the connector set. When signals (electromagnetic wave) propagating through the two signal paths leak to the first circuit substrate 30 and the second circuit substrate 40, the two signals (electromagnetic waves) are unnecessarily coupled via the first circuit substrate 30 and the second circuit substrate 40. In the present embodiment, since a signal (electromagnetic wave) is unlikely to leak between the ground conductors in the first circuit substrate 30 and between the ground conductors in the second circuit substrate 40, the isolation between the first signal path and the second signal path of the connector set is further ensured.

Further, according to the present embodiment, since the interlayer connection conductors 30V are arranged at positions facing the cutout portions 12N and 13N of the first connector 10, a PEC formed by the interlayer connection conductors 30V of the first circuit substrate 30 is disposed in the vicinity of the cutout portions 12N and 13N of the first connector 10. Accordingly, the PEC formed by the interlayer connection conductors 30V acts as a shield at the cutout portions 12N and 13N of the first connector 10. That is, a decrease in the shielding effect due to the presence of the cutout portions 12N and 13N of the first connector 10 is compensated for. Similarly, since the interlayer connection conductors 40V are arranged at positions facing the discontinuous portions 22D of the second external terminal 22 of the second connector 20, a PEC formed by the interlayer connection conductors 40V of the second circuit substrate 40 is disposed in the vicinity of the discontinuous portions 22D of the second external terminal 22 of the second connector 20. Accordingly, the PEC formed by the interlayer connection conductors 40V acts as a shield at the discontinuous portions 22D of the second external terminal 22 of the second connector 20. That is, the PEC formed by the interlayer connection conductors 40V compensates for a decrease in the shielding effect due to the presence of the discontinuous portions 22D of the second external terminal 22 of the second connector 20.

Finally, the description of the above-described embodiments is illustrative and not restrictive in all respects. Variations and modifications can appropriately be made by those skilled in the art. The scope of the disclosure is indicated by the appended claims rather than by the foregoing embodiments. Further, the scope of the present disclosure includes changes from the embodiments within the meaning and range of equivalency of the claims.

What is claimed is:

1. A connector set, comprising:

a first connector mounted on a first circuit substrate, the first connector including a first internal terminal, a first insulation member that fixes the first internal terminal, and a first external terminal having a surrounding shape portion that surrounds the first internal terminal and the first insulation member; and a second connector which is configured to fit to the first connector to and from which the second connector is insertable and removable in an insertion-removal direction, the second connector being mounted on a second circuit substrate having a ground conductor, and the second connector including a second internal terminal, a second insulation member that fixes the second internal terminal, and a second external terminal having a surrounding shape portion that surrounds the second internal terminal and the second insulation member, the second external terminal is connected to the ground conductor of the second circuit substrate, in a state in which the first connector and the second connector are fitted to each other, the first internal terminal and the second internal terminal are in contact with each other, the first external terminal and the second external terminal are fitted to each other, and when viewed in the insertion-removal direction, an outer periphery of the second external terminal covers an outer periphery of the first external terminal and the first external terminal overlaps with the ground conductor of the second circuit substrate, and the first external terminal has a cutout portion at a portion that is part of the surrounding shape portion of the first external terminal and faces the ground conductor of the second circuit substrate.

2. The connector set according to claim 1, wherein a width of the cutout portion is ½ or less of a wavelength of a signal propagating through a transmission path configured of the first external terminal, the first internal terminal, and the first insulation member.

3. The connector set according to claim 1, wherein a depth of the cutout portion is ¼ or less of a wavelength of a signal propagating through a transmission path configured of the first external terminal, the first internal terminal, and the first insulation member.

4. The connector set according to claim 1, wherein the second external terminal has a discontinuous portion in a periphery along a peripheral direction of the first external terminal, and the cutout portion of the first external terminal is at a portion overlapping with the discontinuous portion.

5. The connector set according to claim 1, wherein the first connector has a retaining portion on the outer periphery of the first external terminal, and the second connector has, on an inner periphery of the second external terminal, a ground terminal that is in contact with the outer periphery of the first external terminal and an engaging protrusion portion having spring properties that engages with the retaining portion.

6. The connector set according to claim 5, wherein the first external terminal is coupled to the ground conductor via the second external terminal and the ground terminal.

7. The connector set according to claim 5, wherein the second connector includes at least three ground terminals having contact portions at one ends thereof, and part of the first internal terminal and the second internal terminal is surrounded by three line segments connecting the contact portions of the at least three ground terminals when viewed in the insertion-removal direction.

8. The connector set according to claim 5, wherein the ground terminal has a contact portion at one end and a mount portion at another end, and has a shape extending from the mount portion to the contact portion of the ground terminal while a mounting surface of the ground terminal is kept to face the outer periphery of the first external terminal.

9. The connector set according to claim 1, wherein a plurality of cutout portions, each of which is the cutout portion of the first external terminal, is present, the first external terminal is isolated by the plurality of cutout portions, and a distance between the cutout portions adjacent to each other along a periphery of the surrounding is ½ or less of a wavelength of a signal propagating through a transmission path configured of the first external terminal, the first internal terminal, and the first insulation member.

10. The connector set according to claim 1, wherein the second external terminal has a contact portion that is in contact with the first external terminal in a state in which the first connector and the second connector are fitted to each other.

11. The connector set according to claim 1, wherein the first external terminal has a contact portion that is in contact with the first external terminal in a state in which the first connector and the second connector are fitted to each other.

12. The connector set according to claim 11, wherein the contact portion of the first external terminal is positioned facing the cutout portion with the first internal terminal interposed therebetween when viewed in the insertion-removal direction.

13. The connector set according to claim 2, wherein a depth of the cutout portion is ¼ or less of a wavelength of a signal propagating through a transmission path configured of the first external terminal, the first internal terminal, and the first insulation member.

14. The connector set according to claim 2, wherein the second external terminal has a discontinuous portion in a periphery along a peripheral direction of the first external terminal, and the cutout portion of the first external terminal is at a portion overlapping with the discontinuous portion.

15. The connector set according to claim 2, wherein the first connector has a retaining portion on the outer periphery of the first external terminal, and the second connector has, on an inner periphery of the second external terminal, a ground terminal that is in contact with the outer periphery of the first external terminal and an engaging protrusion portion having spring properties that engages with the retaining portion.

16. The connector set according to claim 6, wherein the ground terminal has a contact portion at one end and a mount portion at another end, and has a shape extending from the mount portion to the contact portion of the ground terminal while a mounting surface of the ground terminal is kept to face the outer periphery of the first external terminal.

17. An electronic circuit device, comprising:

a first circuit substrate, a second circuit substrate, a first connector mounted on the first circuit substrate, and a second connector configured to fit to the first connector to and from which the second connector is insertable and removable in an insertion-removal direction, the second connector being mounted on the second circuit substrate, wherein the second circuit substrate has a ground conductor, the first connector includes a first internal terminal, a first insulation member that fixes the first internal terminal, and a first external terminal having a surrounding shape portion that surrounds the first internal terminal and the first insulation member, the second connector includes a second internal terminal, a second insulation member that fixes the second internal terminal, and a second external terminal having a surrounding shape portion that surrounds the second internal terminal and the second insulation member, the second external terminal is connected to the ground conductor of the second circuit substrate, in a state in which the first connector and the second connector are fitted to each other, the first internal terminal and the second internal terminal are in contact with each other, the first external terminal and the second external terminal are fitted to each other, and when viewed in the insertion-removal direction, an outer periphery of the second external terminal covers an outer periphery of the first external terminal and the first external terminal overlaps with the ground conductor of the second circuit substrate, and the first external terminal has a cutout portion at a portion that is part of the surrounding shape portion of the first external terminal and faces the ground conductor.

18. The electronic circuit device according to claim 17, wherein the first circuit substrate has a first ground conductor on a first surface that is a mounting surface of the first connector, a second ground conductor on an inner layer or a second surface opposed to the first surface, and a plurality of interlayer connection conductors for connecting the first ground conductor and the second ground conductor, and the interlayer connection conductors are arranged at a position facing the cutout portion of the first external terminal when viewed in the insertion-removal direction.

19. The electronic circuit device according to claim 17, wherein the second circuit substrate has a first ground conductor on a first surface that is a mounting surface of the second connector, a second ground conductor on an inner layer or a second surface of the second circuit substrate opposed to the first surface, and a plurality of interlayer connection conductors for connecting the first ground conductor of the second circuit substrate and the second ground conductor of the second circuit substrate, in a state in which the first connector and the second connector are fitted to each other, the second external terminal has a discontinuous portion in a periphery along a peripheral direction of the first external terminal, and the interlayer connection conductors are arranged at a position facing the discontinuous portion when viewed in the insertion-removal direction.

20. The electronic circuit device according to claim 18, wherein the second circuit substrate has a first ground conductor on a first surface that is a mounting surface of the second connector, a second ground conductor on an inner layer or a second surface of the second circuit substrate opposed to the first surface, and a plurality of interlayer connection conductors for connecting the first ground conductor of the second circuit substrate and the second ground conductor of the second circuit substrate, in a state in which the first connector and the second connector are fitted to each other, the second external terminal has a discontinuous portion in a periphery along a peripheral direction of the first external terminal, and the interlayer connection conductors are arranged at a position facing the discontinuous portion when viewed in the insertion-removal direction.

* * * * *